United States Patent
Christiansen et al.

(10) Patent No.: US 11,789,870 B2
(45) Date of Patent: Oct. 17, 2023

(54) RUNTIME ALLOCATION AND UTILIZATION OF PERSISTENT MEMORY AS VOLATILE MEMORY

(71) Applicant: MICROSOFT TECHNOLOGY LICENSING, LLC, Redmond, WA (US)

(72) Inventors: Neal Robert Christiansen, Bellevue, WA (US); Scott Chao-Chueh Lee, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 16/422,946

(22) Filed: May 24, 2019

(65) Prior Publication Data

US 2020/0371936 A1    Nov. 26, 2020

(51) Int. Cl.
*G06F 12/0842* (2016.01)
*G06F 9/50* (2006.01)
*G06F 12/02* (2006.01)
*G06F 12/0813* (2016.01)

(52) U.S. Cl.
CPC ........ *G06F 12/0842* (2013.01); *G06F 9/5016* (2013.01); *G06F 12/023* (2013.01); *G06F 12/0813* (2013.01); *G06F 2212/2542* (2013.01)

(58) Field of Classification Search
CPC .. G06F 12/0842; G06F 9/5016; G06F 12/023; G06F 12/0813; G06F 2212/2542; G06F 2212/7202; G06F 12/0246; G06F 12/0284; G06F 9/455; G06F 2009/45583; G06F 12/02; G06F 9/45558; G06F 9/45583
See application file for complete search history.

(56) References Cited

U.S. PATENT DOCUMENTS

| | | | |
|---|---|---|---|
| 9,727,256 B1* | 8/2017 | Mayatskikh | G06F 3/0607 |
| 2013/0227236 A1* | 8/2013 | Flynn | G06F 12/0292 |
| | | | 711/172 |
| 2016/0170645 A1* | 6/2016 | Kumar | G06F 12/0842 |
| | | | 711/170 |
| 2017/0371695 A1* | 12/2017 | Sanjeepan | G06F 3/0619 |

(Continued)

OTHER PUBLICATIONS

Unified EFI. Advanced Configuration and Power Interface Specification, (2014). (Year: 2014).*

(Continued)

*Primary Examiner* — Michael Krofcheck
(74) *Attorney, Agent, or Firm* — Benjamin Keim; Newport IP, LLC

(57) ABSTRACT

The described technologies enable a computing device to allocate at least a portion of its persistent memory as volatile memory during runtime. At least some implementations create a file in the persistent memory of the computing device. The file is created in the persistent memory of the computing device during runtime of a virtual machine (VM) hosted by the computing device. The file may be allocated to the VM. The file allocated to the VM may be used as volatile memory. For example, the VM may use the file to store temporary data (e.g., volatile data). In some implementations, the temporary data is associated with an application executing in the VM.

20 Claims, 11 Drawing Sheets

(56) References Cited

U.S. PATENT DOCUMENTS

2019/0312772 A1* 10/2019 Zhao ...................... H04L 41/12

OTHER PUBLICATIONS

"International Search Report and Written Opinion Issued in PCT Application No. PCT/US20/028394", dated Jul. 31, 2020, 11 Pages.
Lyon, et al., "Use Memkind to Manage Large Volatile Memory Capacity on Intel Optane DC Persistent Memory", downloaded from https://www.intel.com/content/www/us/en/developer/articles/technical/use-memkind-to-manage-volatile-memory-on-intel-optane-persistent-memory.html#inpage-nav-7, 2018, 6 pages.

* cited by examiner

RUNTIME ALLOCATION AND UTILIZATION OF PERSISTENT MEMORY AS VOLATILE MEMORY

BACKGROUND

A computing device may host one or more virtual machines (VMs). The host computing device may include a host operating system that manages resources of the host computing device.

The resources of a host computing device may include one or more processors and memory used to store data of a VM. The memory used to store the data of the VM may be volatile memory or nonvolatile memory. The volatile memory is generally used to store temporary data that is required to support the functionality of the VM during runtime of the VM. Data stored in the nonvolatile memory (which might also be referred to herein as "persistent memory") is generally available beyond the runtime of the VM, such as after the VM terminates or the host computing device terminates (e.g., at restart, reboot, or power off).

In general, a firmware, such as a basic input output system (BIOS) or a Unified Extensible Firmware Interface (UEFI) firmware, defines an amount of volatile memory and an amount of nonvolatile memory available to the host computing device and therefore available for allocation to the VM. The firmware performs the volatile memory and nonvolatile memory initialization and instantiation during a boot process (e.g., power-on) of the host computing device.

The firmware can be configured to alter the amount of volatile memory and the amount of nonvolatile memory available to the host computing device. However, it is typically necessary to reboot a host computing device to make changes to the configuration of the firmware that defines the amount of volatile memory and the amount of nonvolatile memory available to the host computing device and shareable with the VM.

A host computing device generally implements more persistent memory than volatile memory (e.g., terabytes of persistent memory compared to gigabytes of volatile memory). Because the data access performance of persistent memory is approaching the data access performance of volatile memory, firmware can be configured to allocate some of the persistent memory as volatile memory available to the host computing device and shareable with the VM.

As indicated, the configuration of a host computer can typically be modified only when booting or rebooting of the host computing device. Therefore, configuration of persistent memory as volatile memory available to the host computing device is not possible during runtime of the VMs hosted by the host computing device. It is with respect to these and other technical considerations that the disclosure presented herein is made.

SUMMARY

A technical solution is disclosed that enables a computing device to allocate at least a portion of persistent memory as volatile memory during runtime of VMs hosted by the computing device (i.e., host computing device). The technical advantages of the described implementations and technical solutions are numerous. Specifically, efficient use of available memory is achieved by way of the described implementations. For example, the described implementations enable a host computing device to allocate persistent memory for use as volatile memory during runtime of the host computing device and the VM hosted by the host computing device. Therefore, the current requirement to reboot a host computing device to access the firmware in order to modify a current allocation of persistent and volatile memory is eliminated through the use of the described implementations and solutions. Other technical benefits not specifically identified herein might also be realized through implementations of the disclosed technologies.

The technical solution disclosed herein includes creating a file, such as a data structure, in the persistent memory of the host computing device. The file may be allocated to a VM that is hosted by the host computing device. The file allocated to the VM may be used as volatile memory. For example, the VM may use the file to store temporary data (e.g., volatile data) that is required to support the functionality of the VM during runtime of the VM. In some implementations, the temporary data is associated with an application executing in the VM.

In some implementations, the application executing in the VM generates a memory request, such as a request for volatile memory. The VM may communicate the memory request to the host computing device hosting the VM. For example, a memory manager of the VM may communicate the memory request to the host computing device. In some implementations, the memory request is received and processed by a hypervisor executing on the host computing device.

The host computing device may create a file in the persistent memory. The file created in the persistent memory may be assigned or allocated to the VM. In some implementations, the file is used by the application executing in the VM as volatile memory. For example, the application executing in the VM may allocate temporary data, such as data normally stored in volatile memory, to the file created in the persistent memory.

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithm(s), hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Conventional computing devices allocate volatile memory and non-volatile memory or persistent memory when those devices boot, such as when they are powered-on or rebooted. A technical solution is provided that enables a computing device to allocate at least a portion of persistent memory as volatile memory during runtime of the computing device. The disclosed technical solution also enables a computing device to allocate at least a portion of persistent memory as volatile memory during virtual machine (VM) runtime.

The technical solution presented herein includes creating a file in the persistent memory of the computing device. The file may be allocated to a VM that is hosted by the computing device. The file allocated to the VM may be used as volatile memory. For example, the VM may use the file to store temporary data (e.g., volatile data) that is required to support the functionality of the VM during runtime of the VM. In some implementations, the temporary data is associated with an application executing in the VM.

The technical advantages of the described implementations and technical solutions are numerous. Specifically, efficient use of available memory is achieved by way of the described implementations. For example, the described implementations enable a host computing device to allocate persistent memory for use as volatile memory during runtime of the host computing device and runtime of the VM hosted by the host computing device. Therefore, the conventional requirement of having to execute a reboot of the host computing device to access firmware, to modify a current allocation of persistent and volatile memory, is eliminated through the use of the described implementations and solutions.

This disclosure describes requests, instructions and other communications communicated to various elements associated with one or more computing devices. The disclosed requests, instructions and other communications comprise data communicating or defining the actions to be performed or information conveyed by those requests, instructions and other communications. Furthermore, the described requests, instructions and other communications described herein may be generated by instructions executed by one or more processors of one or more computing devices. For example, the instructions may be associated with one or more application programming interfaces (APIs) executed by the one or more processors of the one or more computing devices.

Figure 1A:
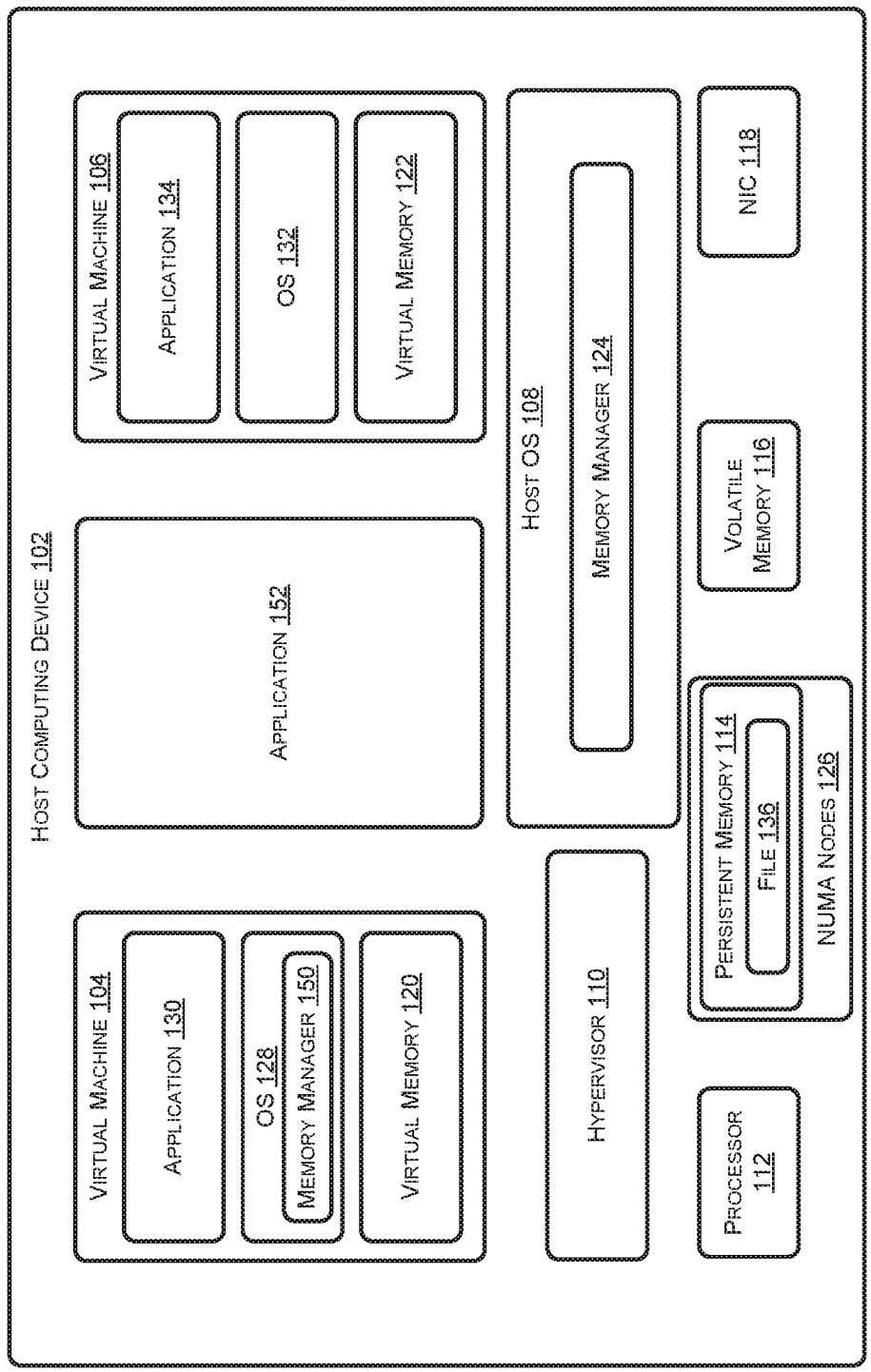
FIGS. 1A, 1B and 2 are block diagrams showing computing devices, implementing virtual machines (VMs), that may be used with one or more of the described implementations.

FIG. 1A illustrates a high-level block diagram of a computing device 102 that may be used with one or more of the described implementations. The computing device 102, also referred to herein as a host computing device 102, may host one or more VMs. In the illustrated example, the host computing device 102 is hosting a VM 104 and a VM 106.

Generally, the host computing device 102 is one or more data processing apparatus, such as a rack mounted server or other computing device. There may be host computing devices 102 in a single physical location or distributed in different physical locations. The host computing devices 102 may have different capabilities and computer architectures.

The host computing device 102 may communicate with other computing devices through a local data communications network (not illustrated). The local data communications network may include one or more wired, e.g., ethernet, or wireless, e.g., Wi-Fi, networks, for example. The host computing device 102 may also communicate with other computing devices on external networks, such as the Internet, through one or more gateways responsible for routing data communication traffic between the local data communications network and the external network.

The host computing device 102 may execute a host operating system (OS) 108. The host OS 108 may manage resources of the host computing device 102. In some implementations, the host OS 108 executes software, such as a hypervisor 110 or other type of VM monitor (VMM), that virtualizes the hardware of the host computing device 102. In some implementations, the hardware virtualized by the hypervisor 110 includes one or more processors 112, persistent memory 114, volatile memory 116, and/or a network interface controller (NIC) 118. The hypervisor 110 may virtualize other hardware of the host computing device 102.

In some implementations, the hypervisor 110 manages concurrent execution of one or more VMs, such as the VM 104 and the VM 106. Each of the VMs 104 and 106 provides virtual instances of physical hardware (e.g., the processor 112, persistent memory 114 and volatile memory 116) which may, but need not, be based on the host computing device 102 and the hardware architecture of the host computing device 102. Virtualized instances of physical hardware associated with the host computing device 102 may be referred to herein as "virtual hardware." For example, the VM 104 includes the virtual memory 120 and the VM 106 includes virtual memory 122. The VM 104 and VM 106, as indicated in the foregoing, may also utilize a virtualized processor and MC.

In some implementations, the virtual memory 120 is implemented by the hypervisor 110. For example, the hypervisor 110 may interface with a memory manager 124 to implement the virtual memory 120. In some implementations, the hypervisor 110 and the memory manager 124 implement the virtual memory 120 in various ways, for example, by mapping pages of the virtual memory 120 to pages of the volatile memory 116. The hypervisor 110 and the memory manager 124 might also map virtual bits or blocks of the virtual memory 120 to physical bits or blocks of the persistent memory 114. The physical bits or blocks of the persistent memory 114 can store data structures, such as one or more files. The virtual memory 122 may be implemented in the same manner as described in relation to the virtual memory 120.

In some examples, the persistent memory 114 is implemented using memory devices, which may include various types of non-volatile memory. Non-volatile memory may include, but is not limited to, non-volatile types of memory that may be bit, byte or block addressable. These bit addressable, block addressable or byte addressable non-volatile types of memory may include, but are not limited to, non-volatile random access memory (NVRAM), NAND flash memory, NOR flash memory, single or multi-level phase change memory (PCM), resistive memory, magneto resistive random access memory (MRAM) memory, 3D XPoint non-volatile memory in dual in-line memory module (DIMM) or solid-state device (SSD) form factor, or other non-volatile memory types.

The persistent memory 114 may be disposed in one or more non-uniform memory access (NUMA) nodes 126. Each of the NUMA nodes 126 may include an associated processor (e.g., the processor 112), volatile memory (e.g., the volatile memory 116) and persistent memory 114. The persistent memory 114 may have a DIMM form factor that is coupled to a NUMA node 126 of the host computing device 102. Alternatively, the persistent memory 114 may have an SSD form factor. The persistent memory 114 may have other form factors.

Furthermore, in some examples, the volatile memory 116 may be composed of one or more memory devices which may include various types of volatile memory. Volatile memory may include, but is not limited to, random-access memory (RAM), Dynamic RAM (DRAM), double data rate synchronous dynamic RAM (DDR SDRAM), or static random-access memory (SRAM), or other types of volatile memory types.

Figure 3:
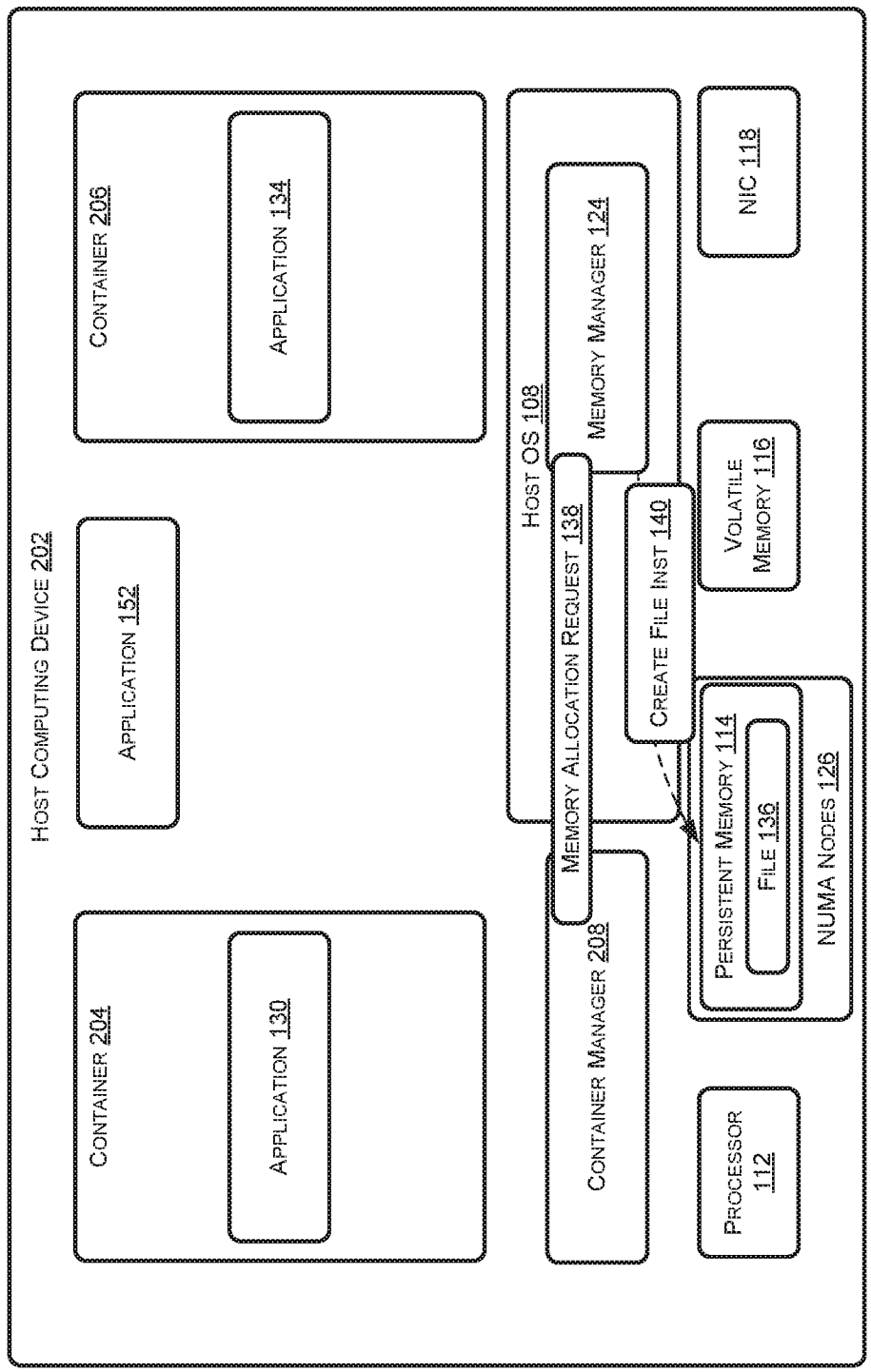
FIGS. 3 and 4 are block diagrams showing computing devices, implementing containers, that may be used with one or more of the described implementations.
Figure 4:
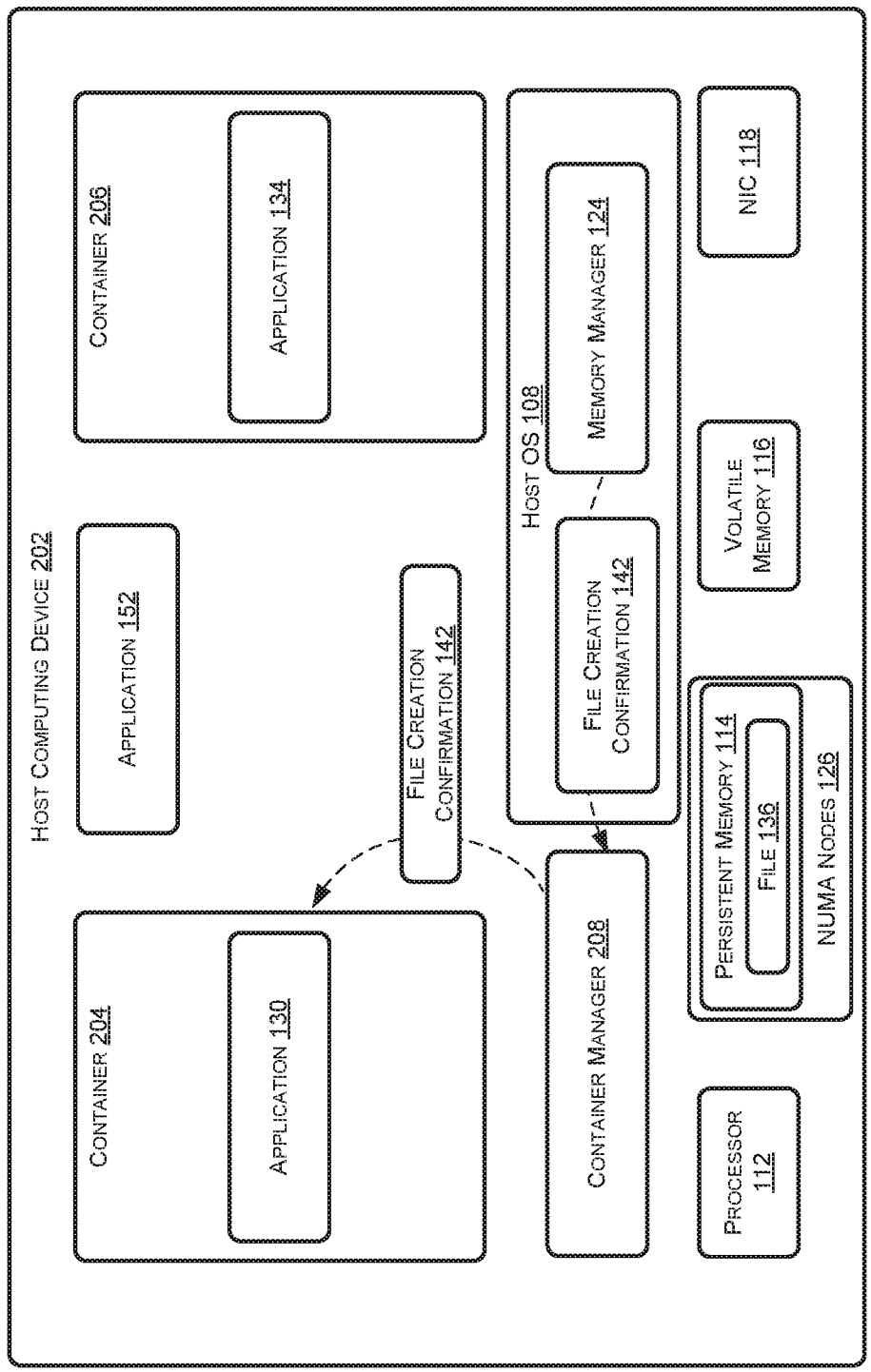
Figure 6:
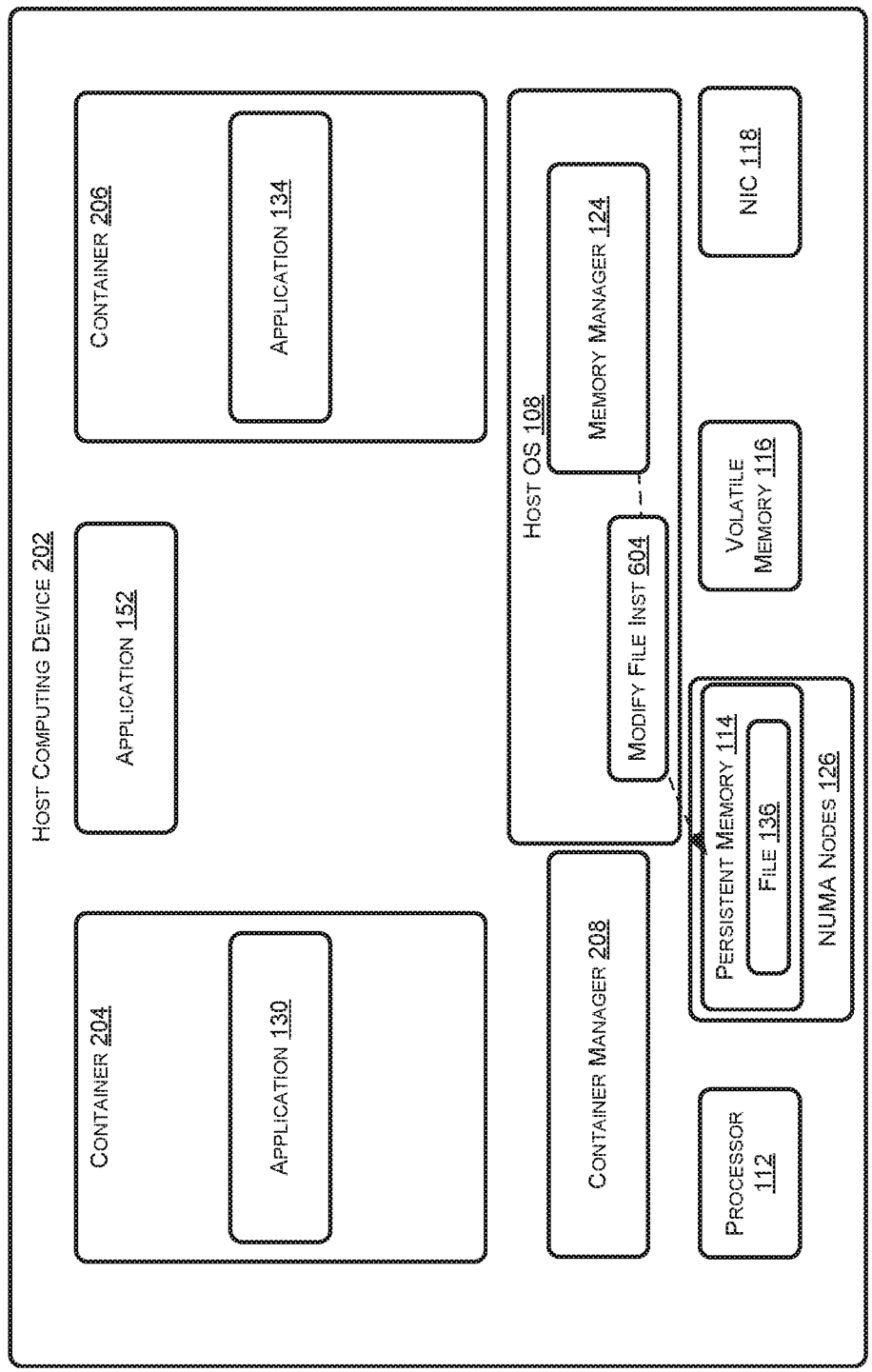

The VM 104 may include an OS 128 and one or more applications 130, also referred to herein VM applications 130. The OS 128 may control the execution of the application 130 within the VM 104 and provides services to the VM 104. In some implementations, the OS 128 includes a memory manager 150. The memory manager 150 may receive and process memory allocation requests from the one or more applications 130. The memory manager 150 may also reside outside of the OS 128. The OS 128 may be a version of a WINDOWS operating system from MICROSOFT CORPORATION or another type of operating system. The OS 128 may be implemented by other operating systems. In some implementations, the VM 104 does not require the implementation of an OS. Such implementations are illustrated in FIGS. 3, 4 and 6.

The OS 128 may manage access to the virtual memory 120 on behalf of the application 130. In other implementations, the application 130 may have direct access to the virtual memory 120.

In some implementations, with reference to the VM 104, when the application 130 or the OS 128 attempts to perform an I/O operation on the virtual memory 120, initiate network communication, or perform another operation, the hypervisor 110 may be interrupted so that the host OS 108, in concert with the hypervisor 110 and the memory manager 124, can perform the operation on behalf of the VM 104. The host OS 108 is able to perform the operation on behalf of the VM 104 by executing the operation in a kernel process space, user process space, or both (not illustrated), of the host computing device 102.

Similarly, the VM 106 may include an OS 132 and one or more applications 134. Functionalities of the VM 106 and its underlying elements may be the same or similar as those described in relation to the VM 104.

The functions of the host computing device 102, for allocating the persistent memory 114 for use as volatile memory, are described in the following. The functions for allocating the persistent memory 114 for use as volatile memory will be described with reference to the VM 104. Similar functions may be performed by the VM 106.

In some implementations, the host OS 108, the hypervisor 110 and/or the memory manager 124 allocate some portion of the persistent memory 114 and some portion of the volatile memory 116 to the volatile memory 116. Conventionally, an amount of the persistent memory 114 and an amount of the volatile memory 116 is established by the firmware of the host computing device 102. As described, modifying an allocation of the persistent memory 114 and the volatile memory 116 conventionally necessitates restarting the host computing device 102 using a reboot process or simply a boot process. However, rebooting the host computing device 102 may not be possible or practical during active runtime instantiations of the VM 104 and/or VM 106.

The described implementations provide techniques that allow for allocating some or all of the persistent memory 114 for use as volatile memory without the conventional requirement of rebooting or booting the host computing device 102. To achieve a runtime allocation of the persistent memory 114 for use as volatile memory, some of the implementations described herein introduce generating one or more files 136 (e.g., at least one data structure or memory allocation) in the persistent memory 114. In some implementations, a memory address range, contiguous or noncontiguous, is defined in the persistent memory 114. The memory address range in the persistent memory 114 may be used as volatile memory.

The file 136 may be allocated to the virtual memory 120 of the virtual machine 104. Specifically, the file 136 may be allocated to the virtual memory 120 and used by the application 130 and/or the OS 128 as volatile memory. Specifically, the file 136 may be used to store temporary data, such as volatile data, that would ordinarily be stored in portions of the volatile memory 116 allocated to the virtual memory 120.

The application 130 may generate a memory request. The memory request may be provided to the OS 128 for forwarding to the host OS 108. Alternatively, the application 130 may communicate the memory request directly to the host OS 108. For example, an application 152 may generate the memory request for direct communication to the host OS 108. In some implementations, the application 152 is a VM application. In another example, the memory request may be generated by the OS 128 on behalf of the application 130 or the OS 128 may generate the memory request autonomously.

In response to the memory request from the VM 104, the host computing device 102, the host OS 108 or the hypervisor 110 may generate a memory allocation request that may include a request for volatile memory. In some implementations, the memory allocation request may include, by way of data, a request for an allocation of the persistent memory 114 that will be used as volatile memory by one or more of the applications 130 or 152 and the OS 128.

The memory allocation request may include, but is not limited to, data specifying (1) a requested amount of memory (e.g. in bytes), (2) whether the requested amount of memory is to be persistent, such as when the host computing device 102 is powered off or rebooted, (3) whether the requested amount of memory is to be encrypted, (4) whether the requested amount of memory is to consume a contiguous portion of the persistent memory 114, (5) whether the requested amount of memory is to be implemented as large pages, super pages, huge pages or gigantic pages, and/or (6) whether the requested amount of memory is to be implemented using persistent memory in a particular one or more NUMA nodes, where the one or more NUMA nodes are identified by respective one or more NUMA node identifiers.

The memory manager 124 may process the memory allocation request. In some implementations, as described above, the hypervisor 110 may receive the memory request from the VM 104 or application 152 and forward the memory request to the OS 108 and/or the memory manager 124.

The memory manager 124 receives the memory allocation request and evaluates the data and content thereof to ascertain the parameters contained in the memory allocation request. Based on policies that control the use of memory and evaluation of the memory allocation request, the memory manager 124 generates a create file instruction for communication to the persistent memory 114.

The create file instruction is provided to the persistent memory 114 and includes data to cause the generation of the file 136 in accordance with the parameters set forth in the create file instruction and encapsulated therein based on the parameter particulars of the memory allocation request. In some implementations, the memory manager 124 interfaces with the file system of the host computing device 102 and/or the host OS 108 to create the file 136.

Figure 1B:
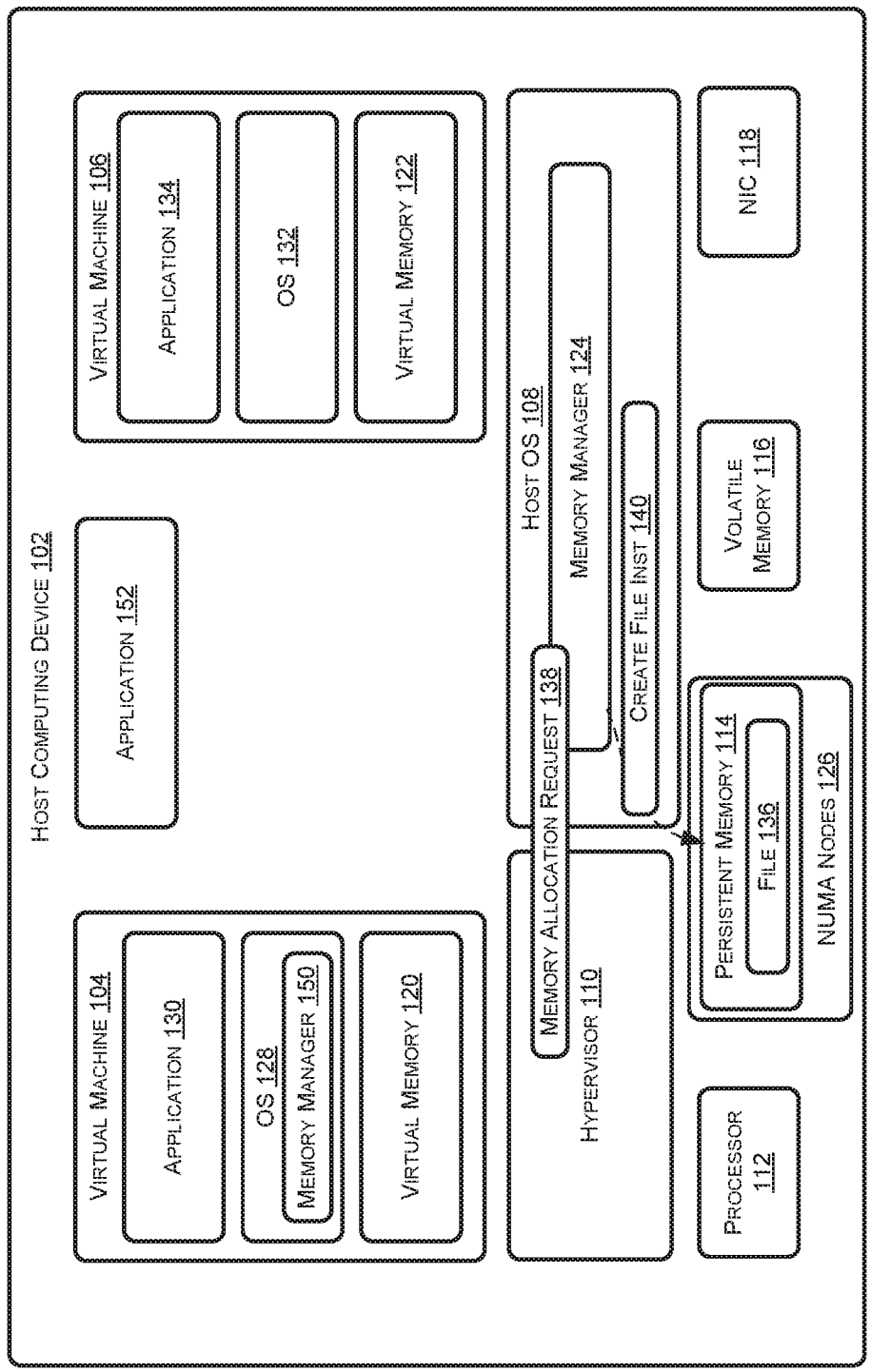

FIG. 1B illustrates a high-level block diagram of the computing device 102 and various request flow that may be used with one or more of the described implementations. The application 130 may generate a memory request. The memory request may be provided to the OS 128 and a memory manager 150 for forwarding to the host OS 108 or the hypervisor 110. Alternatively, the application 130 may communicate the memory request directly to the host OS 108. For example, the application 152 may generate the memory request for direct communication to the host OS 108. In some implementations, the application 152 is a VM application, such as the VM machine 104. In another example, the memory request may be generated by the OS 128 on behalf of the application 130 or the OS 128 may generate the memory request autonomously.

In response to the memory request from the VM 104, the host computing device 102, the host OS 108 or the hypervisor 110 may generate a memory allocation request 138 that may include a request for volatile memory. In some implementations, the memory allocation request 138 may include, by way of data, a request for an allocation of the persistent memory 114 that will be used as volatile memory by one or more of the applications 130 or 152 and the OS 128.

The memory allocation request 138 may include, but is not limited to, data specifying (1) a requested amount of memory (e.g. in bytes), (2) whether the requested amount of memory is to be persistent, such as when the host computing device 102 is powered off or rebooted, (3) whether the requested amount of memory is to be encrypted, (4) whether the requested amount of memory is to consume a contiguous portion of the persistent memory 114, (5) whether the requested amount of memory is to be implemented as large pages, super pages, huge pages or gigantic pages, and/or (6) whether the requested amount of memory is to be implemented using persistent memory in a particular one or more NUMA nodes, where the one or more NUMA nodes are identified by respective one or more NUMA node identifiers.

The memory manager 124 may process the memory allocation request 138. In some implementations, as described above, the hypervisor 110 may receive the memory request from the VM 104 or application 152 and forward the memory request to the OS 108 and/or the memory manager 124.

The memory manager 124 receives the memory allocation request 138 and evaluates the data and content thereof to ascertain the parameters contained in the memory allocation request. Based on policies that control the use of memory and evaluation of the memory allocation request 138, the memory manager 124 generates a create file instruction 140 for communication to the persistent memory 114.

The create file instruction 140 is provided to the persistent memory 114 and includes data to cause the generation of the file 136 in accordance with the parameters set forth in the create file instruction 140 and encapsulated therein based on the parameter particulars of the memory allocation request 138. In some implementations, the create file instruction 140 is provided to the persistent memory 114 through the hypervisor 110. In some implementations, the memory manager 124 interfaces with the file system of the host computing device 102 and/or the host OS 108 to create the file 136.

Figure 2:
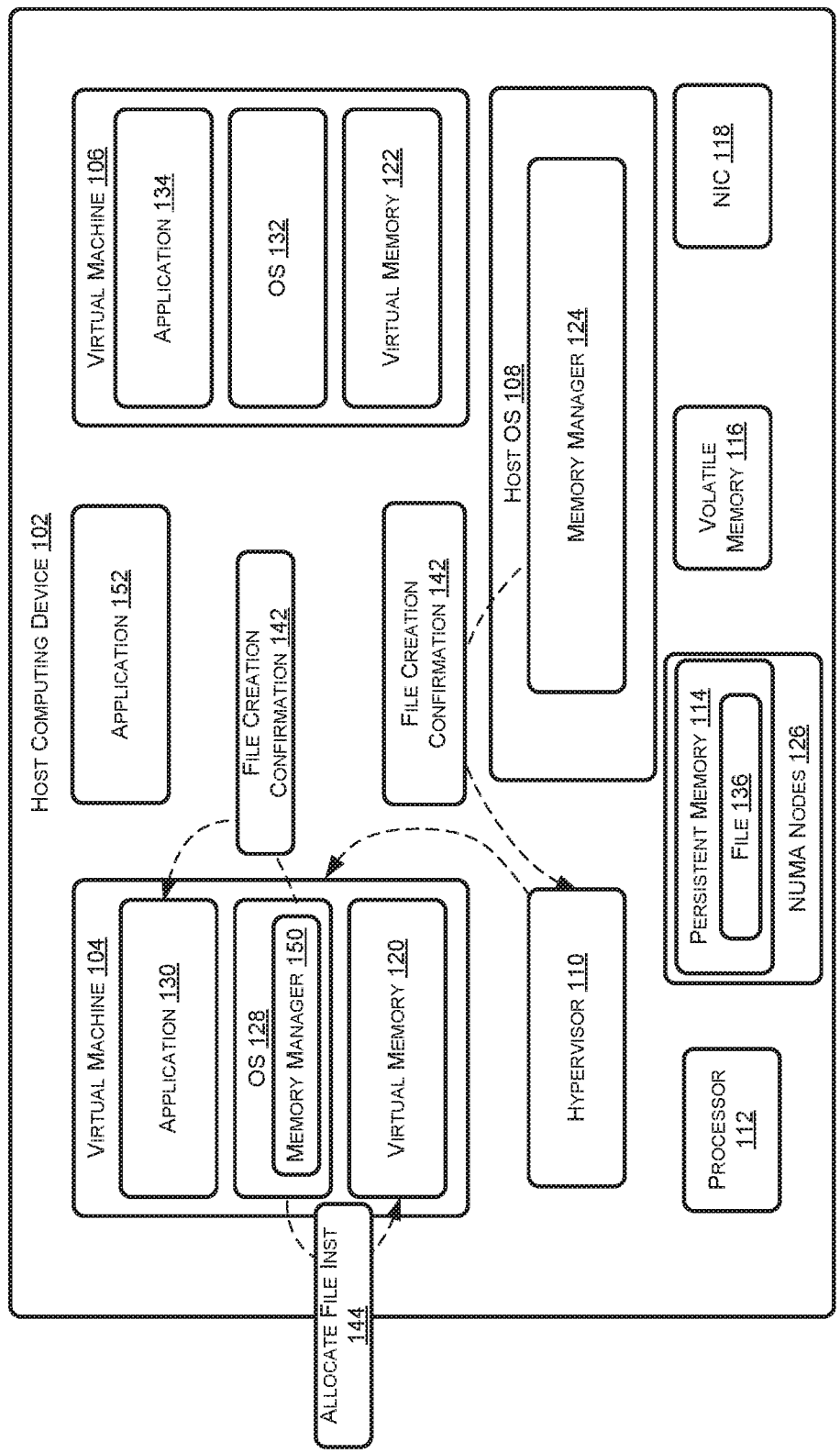

Referring now to FIG. 2, after forwarding the create file instruction 140 (illustrated in FIG. 1B) to the persistent memory 114, the memory manager 124 generates a file creation confirmation 142 that is forwarded to the OS 128 and/or the memory manager 150. As illustrated, the hypervisor 110 may receive the file confirmation 142 and forward the confirmation 142 to the OS 128 and/or the memory manager 150.

The file creation confirmation 142 may include data identifying the corresponding memory allocation request 138 so that the OS 128, the hypervisor 110 and/or the memory manager 150 is able to properly allocate the file 136 to and for use by the requesting application 130 or OS 128.

In addition, the OS 128, the hypervisor 110 and/or the memory manager 150 allocates the file 136 to the virtual memory 120 by way of an allocate file instruction 144. Specifically, once the file 136 is allocated to the virtual memory 120, the requesting application 130 or OS 128 is able to access the file 136 allocated to the virtual memory 120 for use as volatile memory to store temporary data, such as data ordinarily stored in a virtualized portion of the volatile memory 116.

FIG. 3 illustrates a high-level block diagram of a computing device 202 that may be used with one or more of the described implementations. The computing device 202, also referred to herein as a host computing device 202, may host one or more containers. In the illustrated example, the host computing device 202 is hosting a container 204 and a container 206. The containers 204 and 206 may also be considered memory partitions or memory resources associated with the host computing device 202.

The containers 204 and 206 function similarly to the VMs 104 and 106 illustrated in the FIGS. 1A, 1B and 2. The primary difference between the containers 204 and 206 and the VMs 104 and 106 is that the containers 204 and 206 do not implement an OS. Furthermore, the containers 204 and 206 do not include virtualized hardware, such as the virtual memories 120 and 122. Rather, each of the containers 204 and 206 share the host OS 108 and the associated hardware of the host computing device 202. The host OS 108, in concert with a container manager 208, arbitrates sharing functionalities of the host OS 108 and the associated hardware of the host computing device 202 between the container 204 and container 206. The container manager 208 may, in some implementations, be a hypervisor, such as the hypervisor 110 illustrated in FIGS. 1A, 1B and 2.

Generally, the host computing device 202 is one or more data processing apparatus, such as a rack mounted server or other computing device. There may be a plurality of host computing devices 202 in a single physical location or distributed in different physical locations. The host computing devices 202 may have different capabilities and computer architectures.

Host computing devices 202 may communicate with each other through an internal data communications network (not illustrated). The internal data communications network may include one or more wired, e.g., ethernet, or wireless, e.g., Wi-Fi, networks, for example. In some implementations, the internal data communications network is an intranet.

The host computing devices 202 may also communicate with devices on external networks, such as the Internet, through one or more gateways which are data processing apparatuses responsible for routing data communication traffic between the internal data communications network and the external network.

In some implementations, the container manager 208 manages concurrent execution of one or more containers, such as the container 204 and the container 206. The container manager 208 provides a physical hardware system to the container 204 and the container 206 (e.g., the processor 112, persistent memory 114 and volatile memory 116) which may, but need not, be based on the host computing device 202 and the hardware architecture of the host computing device 202.

In some implementations, the container manager 208 may interface with the memory manager 124 to allocate memory, such as persistent memory 114 and volatile memory 116 to the container 204 and/or container 206. In other implementations, the container manager 208 may allocate memory, by performing the functions described with reference to the memory manager 124.

In some implementations, the container manager 208 and the memory manager 124 allocate memory in various ways, for example, by assigning memory pages of the volatile memory 116 to one or more of the containers 204 and 206. And additionally, the container manager 208 and the memory manager 124 may map physical bits or blocks of the persistent memory 114 to one or more of the containers 204 and 206. At least a plurality of the physical bits or blocks of the persistent memory 114 may be used to store one or more files, such as one or more data structures. In other implementations, the container 204 interfaces directly with the host OS 108 and/or the memory manager 124 for memory allocation.

The functions of the host computing device 202, for allocating the persistent memory 114 for use as volatile memory, are described in the following. The functions for allocating the persistent memory 114 for use as volatile memory will be described with reference to the container 204. Similar functions may be performed by the container 206 or other applications executing in the host computing device 202.

In some implementations the container 204 is allocated some portion of the persistent memory 114 and some portion of the volatile memory 116 through the host OS 108 and its container manager 208 and memory manager 124.

To achieve a runtime allocation of the persistent memory 114 for use as volatile memory, some of the implementations described herein introduce generating a file, such as one or more files 136 (e.g., one or more data structures or allocations of memory) in the persistent memory 114, for use by the container 204. The file 136 may be allocated to the container 204. Specifically, the file 136 may be allocated to the container 204 and used by the application 130 as volatile memory. Specifically, the file 136 may be used to store temporary data, such as volatile data, that would ordinarily be stored in portions of the volatile memory 116 allocated to the container 204.

The application 130 or the container 204 may generate a memory request. The memory request may be provided to the host OS 108 via the container manager 208 or directly to the host OS 108. The memory request may include a request for volatile memory. As described in the foregoing, the memory manager 124, the host OS 108 and/or the container manager 208 may include policies that control the usage of the volatile memory 116 and the persistent memory 114.

The container manager 208 or the Host OS 108 may generate the memory allocation request 138. The memory allocation request 138 may be communicated to the memory manager 124.

The memory allocation request 138 may specify parameters defining (1) a requested amount of memory (e.g. in bytes), (2) whether the requested amount of memory is to be persistent, such as after the host computing device 202 is powered off or rebooted, (3) whether the requested amount of memory is to be encrypted, (4) whether the requested amount of memory is to consume a contiguous portion of the persistent memory 114, (5) whether the requested amount of memory is to be implemented as large pages, super pages, huge pages or gigantic pages, and/or (6) whether the requested amount of memory is to be implemented using persistent memory in a particular one or more NUMA nodes, where the one or more NUMA nodes are identified by respective one or more NUMA node identifiers.

The memory manager 124 receives the memory allocation request 138 and identifies the parameters contained therein. The memory manager 124 then utilizes policies for use of memory and the parameters to generate the create file instruction 140 for communication to the persistent memory 114.

The create file instruction 140 is provided to the persistent memory 114 to cause generation of the file 136 in accordance with the parameters set forth in the create file instruction 140 and encapsulated therein based on the parameter particulars of the memory allocation request 138. In some implementations, the memory manager 124 interfaces with the file system of the host computing device 102 and/or the host OS 108 to create the file 136.

Referring now to FIG. 4, after forwarding the create file instruction 140 to the persistent memory 114, the memory manager 124 generates the file creation confirmation 142 that is forwarded to the container manager 208. Alternatively, the host OS 108 or the memory manager 124 may forward the file creation confirmation 142 to the container 204 or the application 130. The file creation confirmation 142 may include data, such as reference to the memory allocation request 138 and/or the memory request, so that the requesting application 130 is able to properly access the file 136. The requesting application 130 is able to access the file 136 allocated thereto for use as volatile memory to store temporary data, such as data ordinarily for storage in the virtual memory 116.

Figure 5:
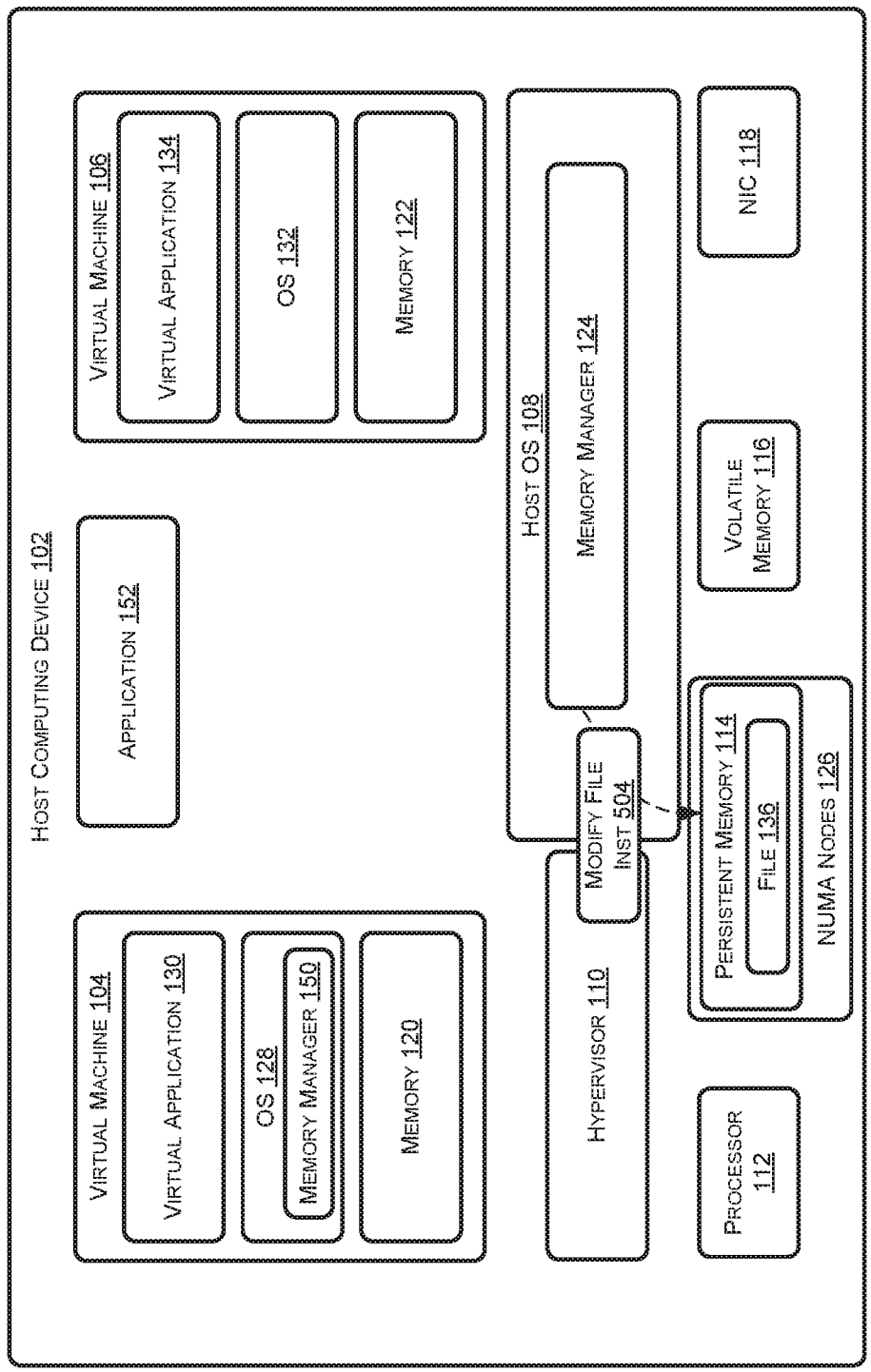
FIGS. 5 and 6 are block diagrams showing several computing devices configured to create a file in persistent memory that may be used with one or more of the described implementations.

FIG. 5 illustrates actions performed by the host computing device 102 to modify the file 136 created in persistent memory 114 for use as volatile memory by the VMs hosted by the host computing device 102, such as the VM 104.

The application 130, the VM 104, and/or the application 152 may request volatile memory. In some implementations, the memory manager 150 receives the request for volatile memory and forwards the request to the hypervisor 110 or the host OS 108. Alternatively, the request may be communicated directly to the host OS 108.

A modify file instruction 504 may be generated by the memory manager 124. The memory manger 124 may generate the modify file instruction 504 in response a volatile memory request from the VM 104, the application 130, the application 152 and/or the hypervisor 110. In some implementations, the memory manager 124 interfaces with the file system of the host OS 108 to generate the modify file instruction 504.

The modify file instruction 504 may include parameters indicating whether the request is (1) a request to expand or shrink and amount of memory (e.g. in bytes) associated with the file 136, (2) a request to delete the file 136, (3) a request to encrypt the file 136, (4) a request to move the file 136 to a contiguous portion of the persistent memory 114, (5) a request to implement the file 136 using large pages, super pages, huge pages or gigantic pages, (6) a request to implement the file 136 in persistent memory associated with a particular one or more NUMA nodes, and/or (7) a request to modify a persistence attribute associated with the file 136.

The modify file instruction 504 is provided to the persistent memory 114. The modify file instruction 504 causes modification of the file 136 in accordance with the data, defining the parameters set forth in the modify file instruction 504, encapsulated therein based on the parameter particulars of the file modification request 502.

FIG. 6 illustrates actions performed by the host computing device 202 to modify the file 136 created in persistent memory 114 and for use as volatile memory by the containers hosted by the host computing device 202, such as the container 204. In particular, the application 130, the application 152, and/or the container 204 may generate a request for virtual memory. The request may be communicated to the container manager 208 and relayed thereby to the host OS 108. Alternatively, the host OS 108 may directly receive the request.

A modify file instruction 604 may be generated by the memory manager 124. The memory manger 124 may generate the modify file instruction 604 in response a volatile memory request from the container 204, the application 130, the application 152 and/or the container manager 208. In some implementations, the memory manager 124 interfaces with the file system of the host OS 108 to generate the modify file instruction 604.

The modify file instruction 604 may specify, using data and indicators of the request, (1) a request to expand or shrink and amount of memory (e.g. in bytes) associated with the file 136, (2) a request to delete the file 136, (3) a request to encrypt the file 136, (4) a request to move the file 136 to a contiguous portion of the persistent memory 114, (5) a request to implement the file 136 using large pages, super pages, huge pages or gigantic pages, (6) a request to implement the file 136 in persistent memory associated with a particular one or more NUMA nodes, and/or (7) request to modify a persistence attribute associated with the file 136.

The modify file instruction 604 is provided to the persistent memory 114. The modify file instruction 604 causes modification of the file 136 in accordance with data defining the parameters set forth in the modify file instruction 604.

Figure 7:
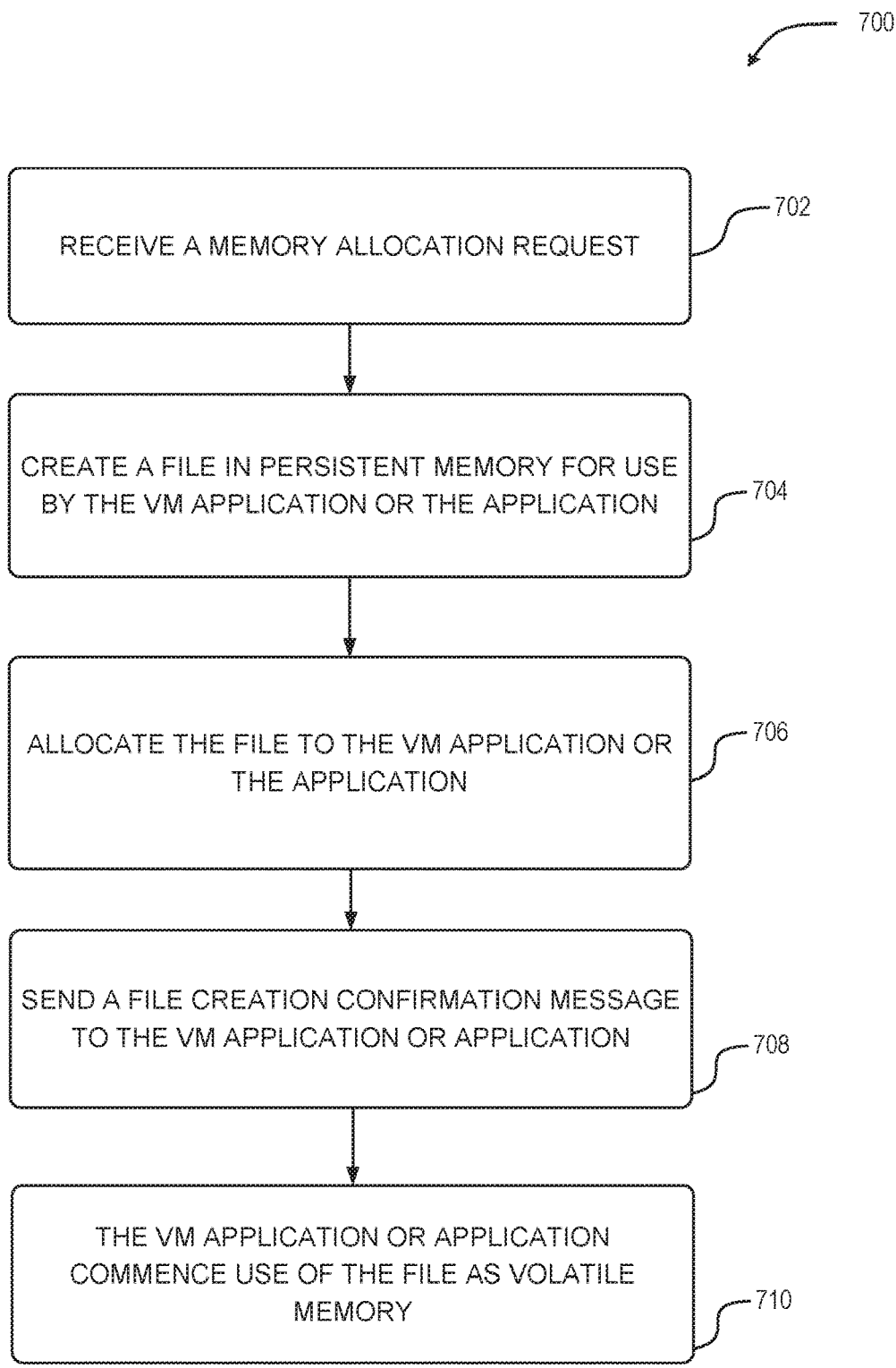
FIG. 7 is a flow diagram showing aspects of one routine disclosed herein for creating a file in persistent memory for use as volatile memory, according to one exemplary embodiment.

FIG. 7 is a flow diagram showing aspects of one routine 700 disclosed herein for creating a file in persistent memory for use as volatile memory, according to one exemplary embodiment. In some implementations, the operations shown in FIG. 7 can be performed by components of one or more computing devices, such one or more of the devices 102 and 202. Therefore, the instructions associated with the routine 700 may be executed by one or more processors associated the devices 102 and 202.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system (e.g., the device(s) 102 and/or 202) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

The routine 700 may begin at operation 702, where a memory allocation request is received. The memory allocation request may include data identifying an amount of persistent memory to be allocated as volatile memory for use by a VM, VM application or application. The memory allocation request may be received and associated with a host computing device and during runtime of the host computing device. For example, the memory allocation request 138 may be received by the host computing device 102 or the host computing device 202. The memory allocation request 138 may be generated in response to a memory request by the VM 104, VM application 130, application 152, or the container 204.

At operation 704, a file is created in persistent memory for use by the VM application or the application. In some implementations, the file 136 is created in the persistent memory 114 associated with the host computing device 102 or the host computing device 202.

At operation 706, the file created in the persistent memory is allocated to the VM application or the application. In some implementations, the file 136 created in the persistent memory is allocated to the VM 104, application 152, VM application 130 or the OS 128 of the host computing device 102 or the container 204 and/or the application 130 or application 152 of the container 204. Allocating the file to the VM application or the application may include identifying the addressing and length of the file allocated to the VM application or the application.

At operation 708, a file creation confirmation message is sent to the VM application or application. The file creation confirmation message may include data identifying the file in the persistent memory for use by the VM application or the application as volatile memory. For example, the file creation confirmation message 142 may be communicated to the VM 104, application 152, VM application 130, or the container 204.

At operation 710, the VM application or the application commence use of the file as volatile memory. For example, the VM application 130, application 152, or the OS 128 of the host computing device 102, or the container 204 and/or the application 130 of the container 204, may use the file 136 as volatile memory.

In some implementations, one or more of the operations 702-708 are performed as a background process that is insulated or hidden from a user. Specifically, the operations 702-708 may be executed on a background execution thread by an operating system, such as the MICROSOFT WINDOWS operating system, software application, and so forth.

Figure 8:
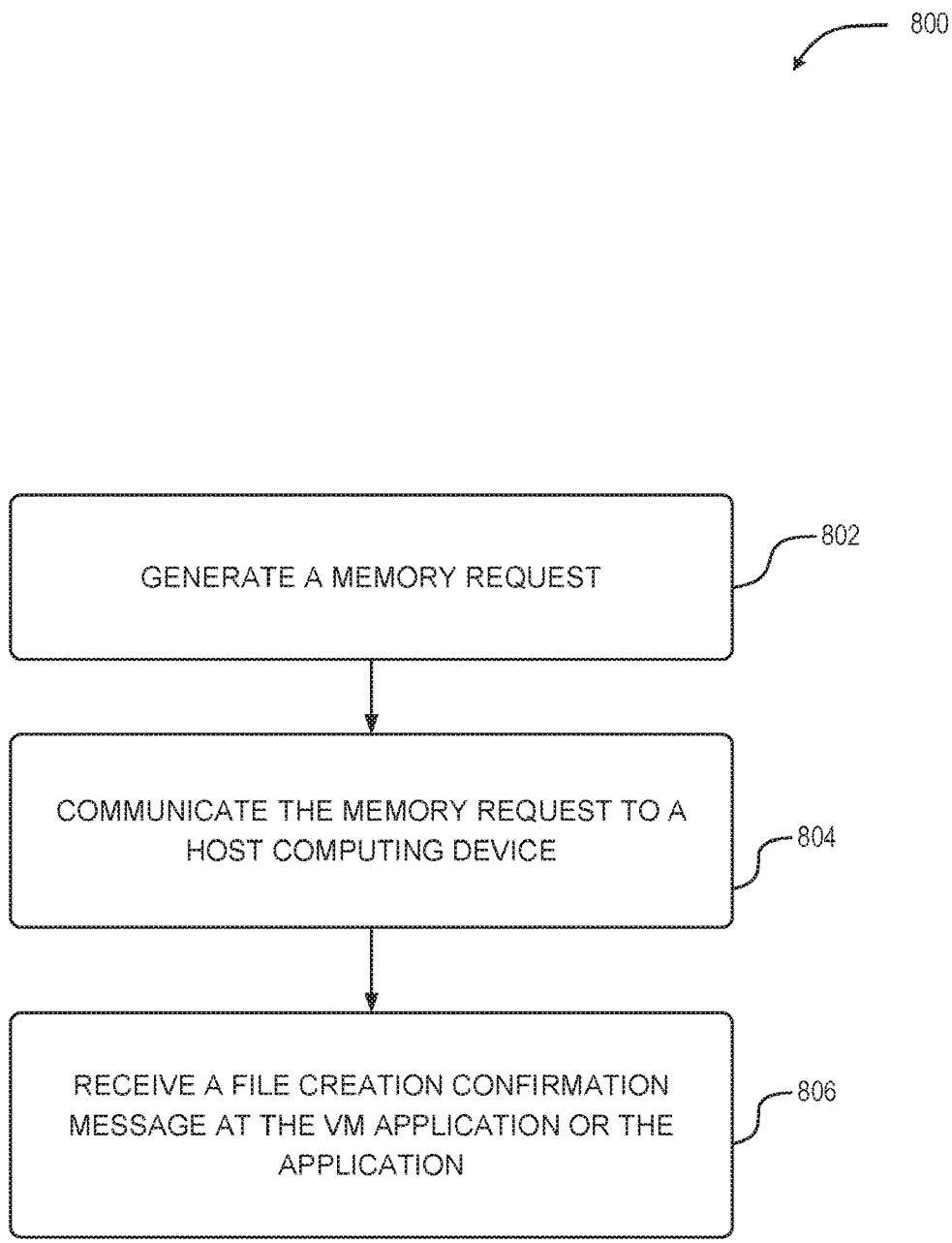
FIG. 8 is a flow diagram showing aspects of one routine disclosed herein for creating a file in persistent memory for use as volatile memory, according to one exemplary embodiment.

FIG. 8 is a flow diagram showing aspects of one routine 800 disclosed herein for creating a file in persistent memory for use as volatile memory, according to one exemplary embodiment. In some implementations, the operations shown in FIG. 8 can be performed by components of one or more computing devices, such one or more of the devices 102 and/or 202. Therefore, the instructions associated with the example routine 800 may be executed by one or more processors associated with the devices 102 and/or 202.

The routine 800 may begin at operation 802, when a memory request is generated at a VM application, VM or application. The memory request may include data identifying a request for volatile memory for use by the VM application, VM or application. In some implementations, the memory request is generated by the VM 104, the application 130, the application 152 or the container 204.

At operation 804, the memory request is communicated to a host computing device. The host computing device may manage memory allocation for the VM application, VM, or application. In some implementations, the memory request is communicated to an element of the host computing device 102 or the host computing device 202. For example, in some implementations, the memory request may be received by the host OS 108 of the host computing device 102 or the host OS 108 of the host computing device 202.

At operation 806, a file creation confirmation message is received at the VM application, VM or the application. In some implementations, the hypervisor, which is also an application, receives the confirmation message. For example, the file creation confirmation message 142 may be generated by the host OS 108 of the host computing device 102 or the host computing device 202. In some implementations, the file creation confirmation message 142 includes data identifying the file 136 created in the persistent memory 114.

In some implementations, one or more of the operations 802-806 are performed using a background execution thread. Specifically, the operations 802-806 may be performed by a background thread executed by an operating system, such as the MICROSOFT WINDOWS operating system, software application, and so forth.

Figure 9:
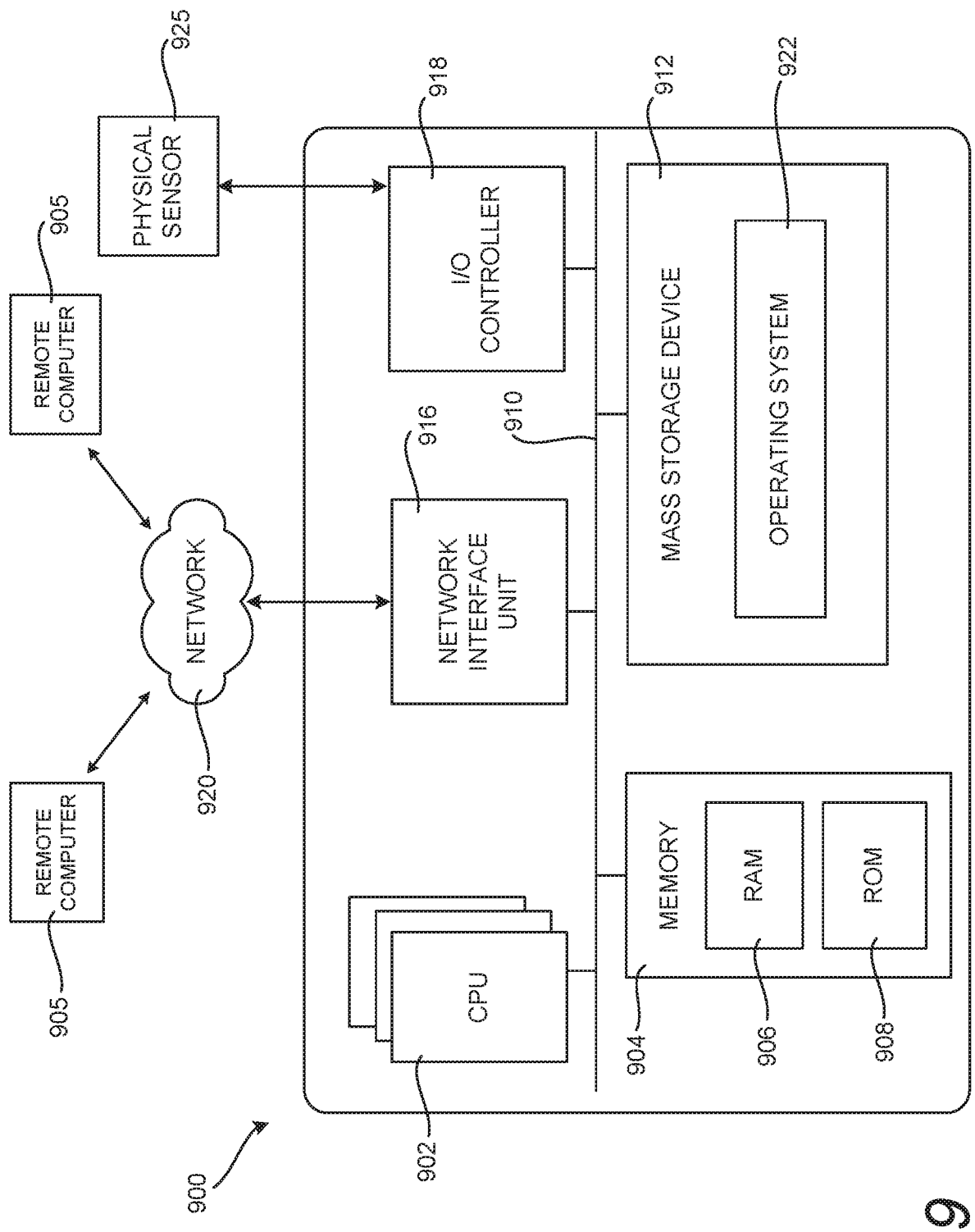
FIG. 9 is a computer architecture diagram showing an illustrative computer hardware and software architecture for a computing device that can implement aspects of the technologies presented herein.

FIG. 9 is a computer architecture diagram showing an illustrative computer hardware and software architecture for a computing device 900 that can implement the various technologies presented herein. In particular, the architecture illustrated in FIG. 9 can be utilized to implement a server computer, mobile phone, an e-reader, a smartphone, a desktop computer, an AR/VR device, a tablet computer, a laptop computer, or another type of computing device. In some implementations, the devices 102 and 202 implement some or all of the elements and functionalities associated with the computing device 900.

The computer 900 illustrated in FIG. 9 includes a central processing unit 902 (CPU), a system memory 904, including a random-access memory 906 (RAM) and a read-only memory (ROM) 908, and a system bus 910 that couples the memory 904 to the CPU 902. A basic input/output system (BIOS or firmware) containing the basic routines that help to transfer information between elements within the computer 900, such as during startup, can be stored in the ROM 908. The computer 900 further includes a mass storage device 912 for storing an operating system 922, application programs, and other types of programs. The mass storage device 912 can also be configured to store other types of programs and data.

The mass storage device 912 is connected to the CPU 902 through a mass storage controller (not shown on FIG. 9) connected to the bus 910. The mass storage device 912 and its associated computer readable media provide non-volatile storage for the computer 900. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer 900. For purposes of the claims, the phrase "computer storage medium," and variations thereof, does not include waves or signals per se or communication media.

According to various configurations, the computer 900 can operate in a networked environment using logical connections to remote computers through a network such as the network 920. The computer 900 can connect to the network 920 through a network interface unit 916 connected to the bus 910. It should be appreciated that the network interface unit 916 can also be utilized to connect to other types of networks and remote computer systems. The computer 900 can also include an input/output controller 918 for receiving and processing input from a number of other devices, including a keyboard, mouse, touch input, an electronic stylus (not shown in FIG. 9), or a physical sensor such as a video camera. Similarly, the input/output controller 918 can provide output to a display screen or other type of output device (also not shown in FIG. 9).

It should be appreciated that the software components described herein, when loaded into the CPU 902 and executed, can transform the CPU 902 and the overall computer 900 from a general-purpose computing device into a special-purpose computing device customized to facilitate the functionality presented herein. The CPU 902 can be constructed from any number of transistors or other discrete circuit elements, which can individually or collectively assume any number of states. More specifically, the CPU 902 can operate as a finite-state machine, in response to executable instructions contained within the software modules disclosed herein. These computer-executable instructions can transform the CPU 902 by specifying how the CPU 902 transitions between states, thereby transforming the transistors or other discrete hardware elements constituting the CPU 902.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 900 in order to store and execute the software components presented herein. It also should be appreciated that the architecture shown in FIG. 9 for the computer 900, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 900 might not include all of the components shown in FIG. 9, can include other components that are not explicitly shown in FIG. 9, or can utilize an architecture completely different than that shown in FIG. 9.

Figure 10:
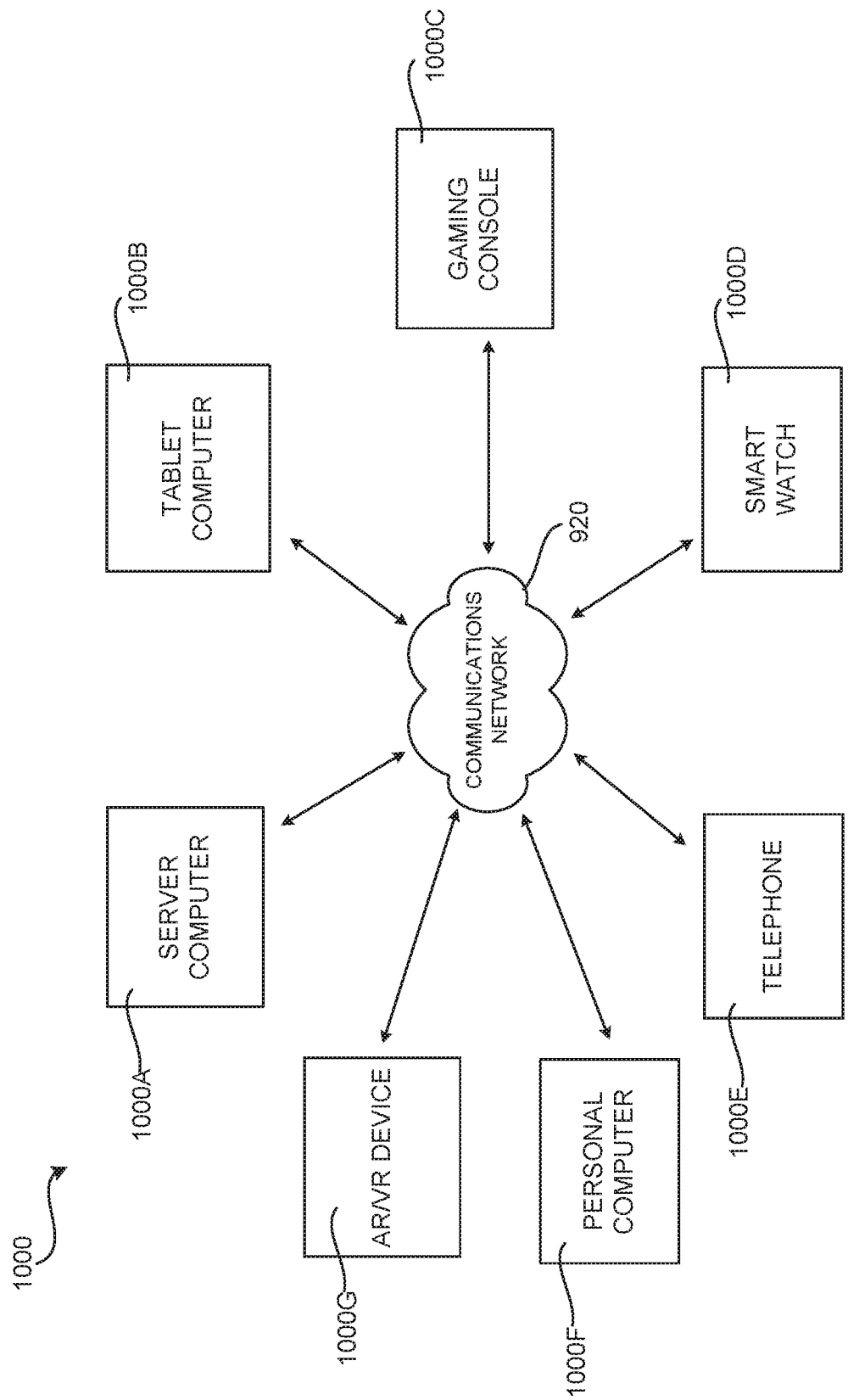
FIG. 10 is a network diagram illustrating a distributed computing environment in which aspects of the disclosed technologies can be implemented.

FIG. 10 is a network diagram illustrating a distributed network computing environment 1000 in which aspects of the disclosed technologies can be implemented, according to various embodiments presented herein. The computing devices 102 and or 202 may implement the distributed network computing environment 1000 to provide distributed storage, via one or more distributed physical or virtual storages associated with one or more computing devices.

As shown in FIG. 10, one or more server computers 1000A can be interconnected via a communications network 920 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of devices such as, but not limited to, a tablet computer 1000B, a gaming console 1000C, a smart watch 1000D, a telephone 1000E, such as a smartphone, a personal computer 1000F, and an AR/VR device 1000G.

In a network environment in which the communications network 920 is the Internet, for example, the server computer 1000A can be a dedicated server computer operable to process and communicate data to and from the devices 1000B-1000G via any of a number of known protocols, such as, hypertext transfer protocol (HTTP), file transfer protocol (FTP), or simple object access protocol (SOAP). Additionally, the network computing environment 1000 can utilize various data security protocols such as secured socket layer (SSL) or pretty good privacy (PGP). Each of the devices 1000B-1000G can be equipped with an operating system operable to support one or more computing applications or terminal sessions such as a web browser (not shown in FIG. 10), or other graphical user interface (not shown in FIG. 10), or a mobile desktop environment (not shown in FIG. 10) to gain access to the server computer 1000A.

The server computer 1000A can be communicatively coupled to other computing environments (not shown in FIG. 10) and receive data regarding a participating user's interactions/resource network. In an illustrative operation, a user (not shown in FIG. 10) may interact with a computing application running on a device 1000B-1000G to obtain desired data and/or perform other computing applications.

The data and/or computing applications may be stored on the server computer 1000A and communicated to cooperating users through the devices 1000B-1000G over an exemplary communications network 920. A participating user (not shown in FIG. 10) may request access to specific data and applications housed in whole or in part on the server computer 1000A. These data may be communicated between the devices 1000B-1000G and the server computer 1000A for processing and storage.

The server computer 1000A can host computing applications, processes and applets for the generation, authentication, encryption, and communication of data and applications, and may cooperate with other server computing environments (not shown in FIG. 10), third party service providers (not shown in FIG. 10), network attached storage (NAS) and storage area networks (SAN) to realize application/data transactions.

It should be appreciated that the computing architecture shown in FIG. 8 and the distributed network computing environment shown in FIG. 10 have been simplified for ease of discussion. It should also be appreciated that the computing architecture and the distributed computing network can include and utilize many more computing components, devices, software programs, networking devices, and other components not specifically described herein.

The disclosure presented herein encompasses the subject matter set forth in the following clauses.

Clause 1. A computer-implemented method for enabling access to at least a portion of a persistent memory of a host computing device for use as a volatile memory, the method comprising: receiving a memory allocation request from a virtual machine (VM) application during a runtime of the host computing device, the memory allocation request comprising data identifying an amount of the persistent memory to be allocated as the volatile memory for use by the VM application; creating a file in the persistent memory usable by the VM application as the volatile memory to store volatile data; sending a file creation confirmation message to the VM application, the file creation confirmation message comprising data identifying the file in the persistent memory usable by the VM application as the volatile memory; and storing the volatile data of the VM application in the file of the persistent memory.

Clause 2. The computer-implemented method according to clause 1, wherein the data identifying an amount of the persistent memory to be allocated comprises parameters for use by the host computing device when creating the file in the persistent memory.

Clause 3. The computer-implemented method according to clause 2, wherein at least one of the parameters defines a size in bytes for the amount of persistent memory to be allocated as volatile memory.

Clause 4. The computer-implemented method according to at least one of clauses 2 or 3, wherein at least one of the parameters comprises a persistence indicator indicating that the file is to remain in the persistent memory when a runtime of the VM application or the host computing device is terminated.

Clause 5. The computer-implemented method according to at least one of clauses 2, 3 or 4, wherein at least one of the parameters comprises a non-uniform memory access (NUMA) node identifier, the NUMA node identifier identifying a NUMA node of the host computing device, and wherein the file in the persistent memory is created in a memory of the NUMA node identified by the NUMA node identifier.

Clause 6. The computer-implemented method according to at least one of clauses 2, 3, 4 or 5, wherein at least one of the parameters comprises a contiguous memory indicator indicating that the file is to be allocated in a contiguous memory region of the persistent memory.

Clause 7. The computer-implemented method according to at least one of clauses 2, 3, 4, 5 or 6, further comprising receiving a memory allocation modification request from the VM application including data comprising a request to expand a size of the file in the persistent memory or a request to shrink the size of the file in persistent memory; and modifying the size of the file in persistent memory based on the data included in the memory allocation modification request from the VM application.

Clause 8. The computer-implemented method according to at least one of clauses 2, 3, 4, 5, 6 or 7, wherein at least one of the parameters comprising data indicating that the file is to be an encrypted file accessible by the VM application.

Clause 9. A computer-implemented method for requesting allocation of volatile memory as non-volatile memory, the method comprising: generating a memory allocation request, the memory allocation request comprising data identifying an amount of persistent memory to be allocated as volatile memory for use by an application; communicating the memory allocation request to a host computing device, the host computing device managing memory allocation to the application; and receiving a file creation confirmation message at the application in response to the memory allocation request, the file creation confirmation message comprising data identifying a file in the persistent memory usable by the application as volatile memory, wherein the memory allocation request and the file creation confirmation message are generated and received, respectively, during runtime of the application.

Clause 10. The computer-implemented method according to clause 9, wherein the data identifying an amount of persistent memory to be allocated as volatile memory comprises parameters for use by the host computing device when creating the file in the persistent memory.

Clause 11. The computer-implemented method according to clause 10, wherein at least one of the parameters defines a size in bytes for the amount of persistent memory to be allocated as volatile memory.

Clause 12. The computer-implemented method according to at least one of clauses 10 or 11, wherein at least one of the parameters comprises a persistence indicator indicating that the file is to remain in the persistent memory when the application or host computing device terminate runtime operation.

Clause 13. The computer-implemented method according to at least one of clauses 10, 11 or 12, wherein at least one of the parameters comprises a non-uniform memory access (NUMA) node identifier, the NUMA node identifier identifying a NUMA node of the host computing device, and wherein the file in the persistent memory is created in a memory of the NUMA node indicated by the NUMA node identifier.

Clause 14. The computer-implemented method according to at least one of clauses 10, 11, 12 or 13, wherein at least one of the parameters comprises a contiguous memory indicator indicating that the file is to be allocated in a contiguous memory region of the persistent memory.

Clause 15. The computer-implemented method according to at least one of clauses 10, 11, 12, 13 or 14, wherein at least one of the parameters comprises data indicating that the file is to be an encrypted file accessible by the application.

Clause 16. A computing device, comprising: a processor; a persistent memory; and a computer-readable storage medium in communication with the processor, the computer-readable storage medium having computer-executable instructions stored thereupon which, when executed by the processor, cause the processor to: receive a memory allocation request from an application or operating system (OS), the memory allocation request comprising data identifying an amount of the persistent memory to be allocated as volatile memory for use by the application or OS, create a file in the persistent memory for use by the application or OS as volatile memory; and send a file creation confirmation message to the application or OS, the file creation confirmation message comprising data identifying the file in the persistent memory for use by the application as volatile memory.

Clause 17. The computing device according to clause 16, wherein the data of the memory allocation request comprises parameters for use by the host computing device when creating the file in the persistent memory.

Clause 18. The computing device according to clause 17, wherein at least one of the parameters defines a size in bytes for the amount of persistent memory to be allocated as volatile memory.

Clause 19. The computing device according to at least one of clauses 17 and 18, wherein at least one of the parameters comprises a persistence indicator indicating that the file is to remain in the persistent memory when the application, OS or host computing device terminate runtime operation.

Clause 20. The computing device according to at least one of clauses 17, 18 or 19, wherein the computer-executable instructions, when executed by the processor, further cause the processor to receive a request from the application or OS to expand the size of the file in the persistent memory or a request to shrink the size of the file in persistent memory.

Although the techniques have been described in language specific to structural features and/or methodological acts, it is to be understood that the appended claims are not necessarily limited to the features or acts described. Rather, the features and acts are described as example implementations of such techniques.

It should be appreciated that the above-described subject matter may be implemented as a computer-controlled apparatus, a computer process, a computing system, or as an article of manufacture such as a computer-readable storage medium. Among many other benefits, the techniques disclosed herein improve efficiencies with respect to a wide range of computing resources. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method for enabling access to at least a portion of a byte-addressable persistent memory of a host computing device for use as a volatile memory, the method comprising:

receiving, by an operating system of the host computing device, a persistent memory allocation request from an application running on the host computing device during a runtime of the host computing device for persistent memory for use by the application as volatile memory, the persistent memory allocation request comprising a requested amount of memory in bytes and a parameter for use by the host computing device when creating a file in the byte-addressable persistent memory that is allocated for use as volatile memory by the application;

generating a create file instruction comprising data to cause generation of the file based on the requested amount of memory in bytes and the parameter contained in the persistent memory allocation request;

creating the file in the byte-addressable persistent memory in accordance with the parameter by mapping a memory address range of physical bits of the byte-addressable persistent memory to be usable by the application as the volatile memory;

sending a file creation confirmation message, the file creation confirmation message comprising data identifying the file in the byte-addressable persistent memory; and storing volatile data of the application in the file created in the byte-addressable persistent memory instead of in volatile memory.

2. The computer-implemented method according to claim 1, wherein the parameter comprises a persistence indicator indicating that the file is to remain in the byte-addressable persistent memory when a runtime of the application or the host computing device is terminated.

3. The computer-implemented method according to claim 1, wherein the parameter comprises a nonuniform memory access (NUMA) node identifier, the NUMA node identifier identifying a NUMA node of the host computing device, and wherein the file in the byte-addressable persistent memory is created in a memory of the NUMA node identified by the NUMA node identifier.

4. The computer-implemented method according to claim 1, wherein the parameter comprises a contiguous memory indicator indicating that the file is to be allocated in a contiguous memory region of the byte-addressable persistent memory.

5. The computer-implemented method according to claim 1, wherein the parameter comprises an indication of a requested amount of memory that is to be implemented as large pages, super pages, huge pages, or gigantic pages.

6. The computer-implemented method according to claim 1, wherein the parameter comprises:

a persistence indicator indicating that the file is to remain in the byte-addressable persistent memory when a runtime of the application or the host computing device is terminated;

a nonuniform memory access (NUMA) node identifier, the NUMA node identifier identifying a NUMA node of the host computing device, and wherein the file in the byte-addressable persistent memory is created in a memory of the NUMA node identified by the NUMA node identifier;

a contiguous memory indicator indicating that the file is to be allocated in a contiguous memory region of the byte-addressable persistent memory; and data indicating that the file is to be an encrypted file accessible by the application.

7. The computer-implemented method according to claim 1, wherein the application is a virtual machine application and the create file instruction is provided through a hypervisor.

8. The computer-implemented method according to claim 1, wherein creating the file in the byte-addressable persistent memory comprises mapping physical bits or blocks of the byte-addressable persistent memory to one or more memory partitions or memory resources.

9. The computer-implemented method according to claim 1, wherein the method is performed at least in part by a background thread of an operating system.

10. The computer-implemented method according to claim 1, further comprising:

allocating the file to the application by identifying addressing and length of the file to the application.

11. A computer-implemented method for requesting allocation of byte-addressable persistent memory of a host computing device for use as volatile memory, the method comprising:

generating by an application running on the host computing device, a persistent memory allocation request during a runtime of the host computing device for persistent memory for use by the application as memory, the volatile persistent memory allocation request comprising a requested amount of memory in bytes and a parameter for use by the host computing device when creating a file in the byte-addressable persistent memory that is allocated for use as volatile memory by the application;

communicating the persistent memory allocation request specifying the requested amount of memory and the parameter to an operating system of the host computing device, the host computing device managing memory allocation to the application;

receiving, from the operating system of the host computing device, a file creation confirmation message at the application in response to the persistent memory allocation request, the file creation confirmation message comprising data identifying the file in the byte-addressable persistent memory; and storing, by the application, volatile data in the file created in the byte-addressable persistent memory instead of in volatile memory, wherein the file has a size that is the requested amount of memory and is created in accordance with the parameter.

12. The computer-implemented method according to claim 11, wherein the parameter comprises a persistence indicator indicating that the file is to remain in the byte-addressable persistent memory when the application or host computing device terminate runtime operation.

13. The computer-implemented method according to claim 11, wherein the parameter comprises a nonuniform memory access (NUMA) node identifier, the NUMA node identifier identifying a NUMA node of the host computing device, and wherein the file in the byte-addressable persistent memory is created in a memory of the NUMA node indicated by the NUMA node identifier.

14. The computer-implemented method according to claim 11, wherein the parameter comprises a contiguous memory indicator indicating that the file is to be allocated in a contiguous memory region of the byte-addressable persistent memory.

15. The computer-implemented method according to claim 11, wherein the parameter comprises data indicating that the file is to be an encrypted file accessible by the application.

16. A computing device, comprising:

a processor;

a persistent memory; and a computer-readable storage medium in communication with the processor, the computer-readable storage medium having computer-executable instructions stored thereupon which, when executed by the processor, cause the processor to:

receive, by an operating system (OS) of the computing device, a persistent memory allocation request from an application running on the computing device for persistent memory for use by the application as volatile memory, the persistent memory allocation request comprising a requested amount of memory in bytes and a parameter for use by the computing device when creating a file in byte-addressable persistent memory of the computing device, wherein the parameter is at least one of:

a persistence indicator indicating that the file is to remain in the byte-addressable persistent memory when the application, OS or computing device terminate runtime operation, a nonuniform memory access (NUMA) node identifier, the NUMA node identifier identifying a NUMA node of the computing device, and wherein the file in the byte-addressable persistent memory is created in a memory of the NUMA node indicated by the NUMA node identifier, a contiguous memory indicator indicating that the file is to be allocated in a contiguous memory region of the byte-addressable persistent memory, or data indicating that the file is to be an encrypted file accessible by the application, create the file in the byte-addressable persistent memory in accordance with the parameter by mapping a memory address range of physical bits of the byte-addressable persistent memory for use by the application as volatile memory; and send a file creation confirmation message, the file creation confirmation message comprising data identifying the file in the byte-addressable persistent memory.

17. The computing device according to claim 16, wherein the computer-executable instructions, when executed by the processor, further cause the processor to receive a request from the application or OS to expand a size of the file in the byte-addressable persistent memory.

18. The computing device according to claim 16, wherein the computer-executable instructions, when executed by the processor, further cause the processor to receive a request from the application or OS to shrink a size of the file in the byte-addressable persistent memory.

19. The computing device according to claim 18, wherein the parameter comprises:
- an indication of a requested amount of memory that is to be implemented as large pages, super pages, huge pages, or gigantic pages; and
- a nonuniform memory access (NUMA) node identifier, the NUMA node identifier identifying a NUMA node of the computing device, and wherein the file in the persistent memory is created in a memory of the NUMA node indicated by the NUMA node identifier.

20. The computing device according to claim 16, wherein the data identifying the file in the byte-addressable persistent memory identifies addressing and length of the file.

* * * * *